United States Patent
Nishimura et al.

(10) Patent No.: US 12,435,165 B2
(45) Date of Patent: Oct. 7, 2025

(54) VINYL ALCOHOL-AMINO ACID ESTER COPOLYMER

(71) Applicants: SEKISUI CHEMICAL CO., LTD., Osaka (JP); TOKUSHIMA UNIVERSITY, Tokushima (JP)

(72) Inventors: Yohei Nishimura, Osaka (JP); Risa Yamazaki, Osaka (JP); Koichi Ute, Tokushima (JP); Miyuki Oshimura, Tokushima (JP); Tomohiro Hirano, Tokushima (JP); Ryo Kagitani, Tokushima (JP)

(73) Assignees: SEKISUI CHEMICAL CO., LTD., Osaka (JP); TOKUSHIMA UNIVERSITY, Tokushima (JP)

( * ) Notice: Subject to any disclaimer, the term of this patent is extended or adjusted under 35 U.S.C. 154(b) by 770 days.

(21) Appl. No.: 17/608,591

(22) PCT Filed: May 8, 2020

(86) PCT No.: PCT/JP2020/018635
§ 371 (c)(1),
(2) Date: Nov. 3, 2021

(87) PCT Pub. No.: WO2020/230711
PCT Pub. Date: Nov. 19, 2020

(65) Prior Publication Data
US 2022/0220234 A1    Jul. 14, 2022

(30) Foreign Application Priority Data
May 10, 2019  (JP) .................................. 2019-090181

(51) Int. Cl.
C08F 16/06   (2006.01)
C08F 8/30    (2006.01)
C08F 16/38   (2006.01)

(52) U.S. Cl.
CPC ................ C08F 16/06 (2013.01); C08F 8/30 (2013.01); C08F 16/38 (2013.01)

(58) Field of Classification Search
CPC ............ C08F 16/06; C08F 8/30; C08F 16/38
See application file for complete search history.

(56) References Cited

U.S. PATENT DOCUMENTS 6,309,999 B1   10/2001  Sharma et al.
2005/0002893 A1  1/2005  Goldmann

FOREIGN PATENT DOCUMENTS

| CN | 101323988 | 12/2008 |
|---|---|---|
| CN | 104059234 | 9/2014 |
| CN | 108043252 | 5/2018 |
| CN | 109251149 | 1/2019 |
| GB | 1 460 649 | 1/1977 |
| JP | 63-153717 | 6/1988 |
| JP | 2-74949 | 3/1990 |
| JP | 10-72509 | 3/1998 |
| JP | 11-199632 | 7/1999 |
| JP | 11-302973 | 11/1999 |
| JP | 2006-314285 | 11/2006 |
| JP | 2009-502332 | 1/2009 |
| JP | 2016-108677 | 6/2016 |

(Continued)

OTHER PUBLICATIONS

Effects of Degree of Formaldehyde Acetal Treatment and Maleic Acid Crosslinking on Solubility and Diffusivity of Water in PVA Membranes (Year: 2003).*
Ejiri JP 2006/314285 A (JPO translation) (Year: 2006).*
"Phenol," Hawley's Condensed Chemical Dictionary (2007), accessed https://onlinelibrary.wiley.com/doi/10.1002/9780470114735.hawley12615, 2025. (Year: 2007).*
Lim, Biomaterials, 34 (2013) p. 7097-7105. (Year: 2013).*
Nita Tudorachi et al., "Synthesis and characterization of poly(vinyl alcohol-co-aspartic acid) copolymers", Polimery, vol. 55, nr 7-8, pp. 562-567, Jul. 2010.
Dongjian Shi et al., "pH-dependent and self-healing properties of mussel modified poly(vinyl alcohol) hydrogels in a metal-free environment", RSC Advances, vol. 5, 2015, pp. 82252-82258.

(Continued)

*Primary Examiner* — Robert C Boyle
(74) *Attorney, Agent, or Firm* — Wenderoth, Lind & Ponack, L.L.P.

(57) ABSTRACT

The present invention provides a vinyl alcohol-amino acid ester copolymer that is excellent in properties such as cell culture properties, biocompatibility, antibacterial properties, and solubility in organic solvents, and is applicable to the medical field, the biomaterial field, and the agricultural field (medical and life science fields). Provided is a vinyl alcohol-amino acid ester copolymer including a unit represented by the following formula (1) and a unit represented by the following formula (2):

[Chem. 1]

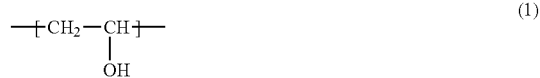

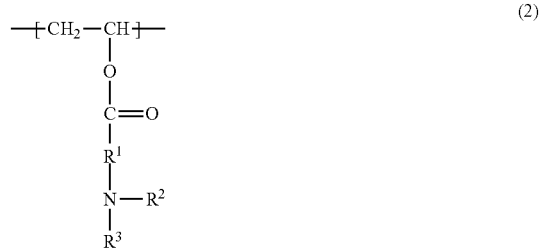

where, in the formula (2), $R^1$ represents a hydrocarbon group that may optionally have a substituent, $R^2$ and $R^3$ each independently represent a hydrogen atom or a hydrocarbon group, and $R^1$ and $R^2$, or $R^2$ and $R^3$, may optionally be bonded together to form a cyclic structure.

7 Claims, No Drawings

(56) References Cited

FOREIGN PATENT DOCUMENTS

JP      2016-151071      8/2016
WO    2007/015977      2/2007

OTHER PUBLICATIONS

Charles R. Nuttelman et al., "Attachment of fibronectin to poly(vinyl alcohol) hydrogels promotes NIH3T3 cell adhesion, proliferation, and migration", Journal of Biomedical Materials Research, 2001, pp. 217-223.

International Search Report issued Jul. 21, 2020 in International (PCT) Application No. PCT/JP2020/018635.

* cited by examiner

VINYL ALCOHOL-AMINO ACID ESTER COPOLYMER

TECHNICAL FIELD

The present invention relates to vinyl alcohol-amino acid ester copolymers.

BACKGROUND ART

Life science fields, including the medical field, the cosmetic field, and the food container field, have used various polymers. Many of these polymers must ensure safety on the assumption that they are used for the human body. Well-known polymers used in these fields include polystyrene, poly(methyl methacrylate), poly(vinyl chloride), poly(vinyl alcohol) (PVA), polyethylene, polypropylene, and polyacrylamide. These polymers are used in various forms such as particles, containers, plates, films, and tubes.

In particular, PVA has attracted attention as a matrix polymer because PVA, like polylactic acid, has biodegradability that minimizes environmental burden in the disposal process, and also because it is a water-soluble polymer.

For example, Patent Literature 1 discloses introducing an amine into PVA to impart biocompatibility to the PVA. Patent Literature 2 discloses an amino group-modified PVA in which an amino group is bonded via a sulfur atom or the like.

CITATION LIST

Patent Literature

Patent Literature 1: JP H11-302973 A
Patent Literature 2: JP H11-199632 A

SUMMARY OF INVENTION

Technical Problem

However, bonding the amino group by the methods disclosed in Patent Literatures 1 and 2 may result in insufficient performance because the obtained PVA does not have a copolymer structure with an amino acid ester. Such PVA is difficult to use in applications that require cell culture, such as in vivo regenerative medicine applications. Such PVA also has insufficient compatibility with biological tissue, thus requiring enhancement of biocompatibility.

In addition, such PVA has not produced satisfactory results in terms of solubility in organic solvents.

The present invention aims to provide a vinyl alcohol-amino acid ester copolymer that is excellent in properties such as cell culture properties, biocompatibility, antibacterial properties, and solubility in organic solvents, and is applicable to the medical field, the biomaterial field, and the agricultural field (medical and life science fields).

Solution to Problem

The present invention relates to a vinyl alcohol-amino acid ester copolymer including a unit represented by the following formula (1) and a unit represented by the following formula (2).

The present invention is described in detail below.

[Chem. 1]

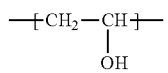

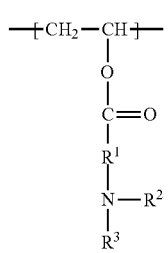

In the formula (2), $R^1$ represents a hydrocarbon group that may optionally have a substituent, $R^2$ and $R^3$ each independently represent a hydrogen atom or a hydrocarbon group, and $R^1$ and $R^2$, or $R^2$ and $R^3$, may optionally be bonded together to form a cyclic structure.

The vinyl alcohol-amino acid ester copolymer of the present invention includes the unit represented by the formula (1) (hereinafter referred to as a vinyl alcohol unit).

The presence of such a vinyl alcohol unit enables control of hydrophilicity.

The lower limit of the content of the unit represented by the formula (1) in the vinyl alcohol-amino acid ester copolymer of the present invention is preferably 0.1 mol %, more preferably 0.5 mol %, still more preferably 1 mol %, further preferably 5 mol %, particularly preferably 10 mol %, especially preferably 20 mol %, very preferably 30 mol %. The upper limit thereof is preferably 99.9 mol %, more preferably 99.5 mol %, still more preferably 99 mol %, further preferably 95 mol %, particularly preferably 90 mol %, especially preferably 80 mol %, very preferably 75 mol %, for example 70 mol % or less, particularly 65 mol % or less.

When the content is within such a range, hydrophilicity, hydrophobicity, and reactivity can be controlled. Moreover, the resulting copolymer can be excellent in properties such as cell culture properties, biocompatibility, antibacterial properties, and solubility in organic solvents.

The content of the unit represented by the formula (1) can be measured by $^1$H-NMR (the same shall apply to other units).

The vinyl alcohol-amino acid ester copolymer of the present invention includes the unit represented by the formula (2) (hereinafter referred to as amino acid ester unit).

The presence of such an amino acid ester unit can impart unprecedented properties to the vinyl alcohol-amino acid ester copolymer, such as biocompatibility, cell culture properties, antibacterial properties, and excellent solubility in organic solvents.

In the formula (2), $R^1$ represents a hydrocarbon group that may optionally have a substituent.

The presence of the hydrocarbon group that may optionally have a substituent can further impart functions such as biocompatibility, cell culture properties, antibacterial properties, and solubility in organic solvents.

Here, the hydrocarbon group includes aliphatic hydrocarbon groups, alicyclic hydrocarbon groups, aromatic hydrocarbon groups, and hydrocarbon groups formed by bonding of two or more of these.

The hydrocarbon group is preferably a divalent hydrocarbon group.

Examples of the divalent hydrocarbon group include C1-C20 (preferably C1-C15, more preferably C1-C10, still more preferably C1-C7, further preferably C1-C5, particularly preferably C1-C3) linear or branched alkylene groups. Examples also include: C2-C20 (preferably C2-C15, more preferably C2-C10, still more preferably C2-C7, further preferably C2-C5, particularly preferably C2-C3) linear or branched alkenylene groups; cycloalkylene groups; cycloalkylidene groups; arylene groups; and benzylidene groups.

Examples of the C1-C20 linear or branched alkylene groups include methylene, methylmethylene (ethylidene), ethylmethylene (propylidene), dimethylmethylene (isopropylidene), ethylmethylmethylene, ethylene, propylene, trimethylene, tetramethylene, and hexamethylene groups.

Examples of the C2-C20 linear or branched alkenylene groups include a propenylene group.

Examples of the cycloalkylene groups include 1,3-cyclopentylene, 1,2-cyclohexylene, 1,3-cyclohexylene, and 1,4-cyclohexylene groups.

Examples of the cycloalkylidene groups include cyclopropylene, cyclopentylidene, and cyclohexylidene groups.

Examples of the arylene groups include 1,2-phenylene, 1,3-phenylene, and 1,4-phenylene groups.

Examples of the substituent include C1-C20 (preferably C1-C15, more preferably C1-C10, still more preferably C1-C7, further preferably C1-C5, particularly preferably C1-C3) alkoxy groups and C6-C30 (preferably C6-C20, more preferably C6-C10) aryloxy groups. Examples also include C2-C20 (preferably C2-C15, more preferably C2-C10, still more preferably C2-C7) alkoxycarbonyl groups and C7-C30 (preferably C7-C20, more preferably C7-C15, still more preferably C7-C10) aryloxycarbonyl groups. Examples also include C1-C20 (preferably C1-C15, more preferably C1-C10, still more preferably C1-C7, further preferably C1-C5, particularly preferably C1-C3) acyloxy groups and C1-C20 (preferably C1-C15, more preferably C1-C10, still more preferably C1-C7, further preferably C1-C5, particularly preferably C1-C3) acyl groups. Examples also include C1-C20 (preferably C1-C15, more preferably C1-C10, still more preferably C1-C7, further preferably C1-C5, particularly preferably C1-C3) carbamoyl groups and C0-C30 (preferably C1-C20, more preferably C1-C15, still more preferably C1-C10, further preferably C1-C5) sulfamoyl groups. Examples also include halogen atoms, C1-C20 alkylthio groups, C6-C30 arylthio groups, C0-C20 alkylsulfonyl groups, C6-C30 arylsulfonyl groups, a phenolic group, a hydroxy group, a carboxy group, a cyano group, a hydrazino group, C1-C20 urea groups, C1-C20 thiourea groups, and a nitro group. These substituents may be used alone or in combination of two or more thereof. To further improve biocompatibility and biodegradability, the substituent preferably has a hydrophilic functional group (e.g., a hydroxy group, a carboxy group, a phenol group, an amino group).

In particular, for further improvement of biocompatibility, preferred for the $R^1$ are a C1-C20 linear or branched alkylene group having a phenol group as a substituent and a C1-C20 linear or branched alkylene group having a C2-C20 alkoxycarbonyl group as a substituent. More preferred is a C1-C20 linear or branched alkylene group having a phenol group as a substituent. Still more preferred is an ethylidene group having a phenolic group as a substituent.

[Chem. 2]

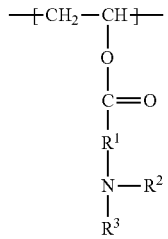

In the formula (2), the $R^2$ and $R^3$ each independently represent a hydrogen atom or a hydrocarbon group. $R^1$ and $R^2$, or $R^2$ and $R^3$, may be optionally bonded together to form a cyclic structure.

$R^2$ and $R^3$ may be the same as or different from each other. The hydrocarbon group is preferably an alkyl group or an alkylene group. The alkyl group or alkylene group is preferably a C1-C20 alkyl group or a C1-C20 alkylene group.

When $R^2$ and $R^3$ are bonded together to form a cyclic structure, $R^2$ and $R^3$ form a cyclic structure with a N atom. When $R^2$ and $R^3$ form a cyclic structure with a N atom, the total carbon number of $R^2$ and $R^3$ is preferably 2 to 20, more preferably 3 to 10, still more preferably 4 to 8.

When $R^1$ and $R^2$ are bonded together to form a cyclic structure, $R^1$ and $R^2$ form a cyclic structure with a N atom. When $R^1$ and $R^2$ form a cyclic structure with a N atom, the total carbon number of $R^1$ and $R^2$ is preferably 2 to 20, more preferably 3 to 10, still more preferably 4 to 8.

Examples of the cyclic structure formed when $R^1$ and $R^2$ or $R^2$ and $R^3$ are bonded together include pyrrolidine and piperidine.

In the present invention, preferably, in the unit represented by the formula (2), $R^1$ is a divalent hydrocarbon group that may optionally have a substituent, and $R^2$ and $R^3$ are each a hydrogen atom or an alkyl group, particularly preferably both $R^2$ and $R^3$ are hydrogen atoms.

The lower limit of the content of the unit represented by the formula (2) in the vinyl alcohol-amino acid ester copolymer of the present invention is preferably 0.1 mol %, more preferably 0.5 mol %, still more preferably 1 mol %, further preferably 5 mol %, particularly preferably 10 mol %, especially preferably 20 mol %, and very preferably 25 mol %. For example, the lower limit is 30 mol % or more, particularly 35 mol % or more. The upper limit of the content is preferably 99.9 mol %, more preferably 99.5 mol %, still more preferably 99 mol %, further preferably 95 mol %, particularly preferably 90 mol %, especially preferably 80 mol %, and very preferably 70 mol %.

When the content is within such a range, functions such as biocompatibility, cell culture properties, antibacterial properties, and excellent solubility in organic solvents can be imparted to the vinyl alcohol-amino acid ester copolymer.

The vinyl alcohol-amino acid ester copolymer of the present invention may have any weight average molecular weight, but preferably have a weight average molecular weight of 1,000 to 1,000,000.

The vinyl alcohol-amino acid ester copolymer of the present invention preferably has a degree of polymerization of 200 to 3,000, more preferably 250 to 2,500, still more preferably 300 to 2,000. The vinyl alcohol-amino acid ester copolymer having a degree of polymerization within the above range has applicability in a wide range of fields.

In the present invention, the degree of polymerization, the number average molecular weight, and the weight average molecular weight can be measured by gel permeation chromatography with polyethylene glycol standards using DMSO as an eluent and Shodex LF-804 (8.0 mm ID×300 ml)×1 as a column.

The lower limit of the viscosity of a 4% by weight aqueous solution of the vinyl alcohol-amino acid ester copolymer of the present invention is preferably 1.0 mPa·s, more preferably 2.0 mPa·s as measured at 20° C. The upper limit thereof is preferably 500 mPa·s, more preferably 400 mPa·s. When the viscosity is within the above range, the vinyl alcohol-amino acid ester copolymer formed into an aqueous solution can have improved handleability.

The viscosity can be measured in accordance with JIS K 6726.

The vinyl alcohol-amino acid ester copolymer of the present invention preferably includes a unit represented by the following formula (3) (hereinafter also referred to as an acetal unit). The vinyl alcohol-amino acid ester copolymer with the acetal unit allows easy control of hydrophilicity and hydrophobicity and can have improved strength.

[Chem. 3]

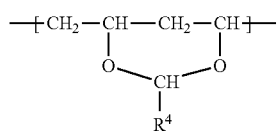

(3)

In the formula (3), $R^4$ represents a hydrogen atom or a C1-C20 alkyl group.

In the formula (3), when $R^4$ is a C1-C20 alkyl group, examples of the alkyl group include methyl, ethyl, n-propyl, isopropyl, n-butyl, iso-butyl, sec-butyl, and tert-butyl groups. Examples also include pentyl, hexyl, heptyl, 2-ethylhexyl, octyl, nonyl, decyl, undecyl, dodecyl, tridecyl, tetradecyl, pentadecyl, and. octadecyl groups. For improvement of mechanical strength, preferred among these are methyl and n-propyl groups. An n-propyl group is more preferred.

In the vinyl alcohol-amino acid ester copolymer of the present invention, the lower limit of the content of the acetal group-containing unit represented by the formula (3) is preferably 0.5 mol %, more preferably 1.0 mol %, still more preferably 5.0 mol %, further preferably 10.0 mol %. The upper limit thereof is preferably 90 mol %, more preferably 80 mol %, still more preferably 70 mol %, further preferably 65 mol %.

When the content of the acetal unit is not less than the lower limit, solubility in organic solvents can be improved. When the content of the acetal unit is not more than the upper limit, a poly(vinyl acetal) resin having excellent toughness can be obtained.

The content of the acetal unit herein can be calculated by a method of counting constitutional units with two hydroxy groups having been acetalized, because the acetal group in the vinyl alcohol-amino acid ester copolymer is obtained by acetalizing a constitutional unit having two hydroxy groups.

For the control of hydrophilicity, hydrophobicity and the melting point, the vinyl alcohol-amino acid ester copolymer of the present invention preferably includes a vinyl acetate-containing unit represented by the following formula (4) (hereinafter also referred to as a vinyl acetate unit).

[Chem. 4]

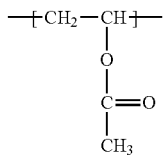

(4)

In the vinyl alcohol-amino acid ester copolymer of the present invention, the lower limit of the content of the vinyl acetate unit represented by the formula (4) is preferably 0.5 mol %, more preferably 1.0 mol %, still more preferably 1.5 mol %. The upper limit thereof is preferably 99.5 mol %, more preferably 99 mol %, still more preferably 90 mol %, further preferably 80 mol %, particularly preferably 70 mol %, especially preferably 60 mol %, for example 50 mol % or less, particularly 30 mol % or less.

When the content is within such a range, the hydrophobicity of the vinyl alcohol-amino acid ester copolymer can be controlled.

The vinyl alcohol-amino acid ester copolymer of the present invention may further include a unit containing a different monomer.

The different monomer is not limited, and is preferably a monomer containing in the molecule one olefinic double bond and at least one polar group selected from the group consisting of a carboxy group, an amide group, an epoxy group, and an ether group. Examples of such a monomer include crotonic acid, maleic acid, fumaric acid, citraconic acid, mesaconic acid, and itaconic acid.

The content of the unit containing the different monomer in the vinyl alcohol-amino acid ester copolymer of the present invention is not limited because it is designed according to application. The content is preferably 20 mol % or less, more preferably 10 mol % or less, still more preferably 5 mol % or less relative to the entire vinyl alcohol-amino acid ester copolymer.

In the vinyl alcohol-amino acid ester copolymer of the present invention, the units represented by the formula (1) and the formula (2), the optional units represented by the formula (3) and the formula (4), and the optional unit containing the different monomer may be in a random or block arrangement.

The vinyl alcohol-amino acid ester copolymer of the present invention is preferably produced by, for example, a method including the step of transesterification of a raw material PVA using a dianionic zinc ate complex represented by the following formula (5) (transesterification method).

The method for producing the vinyl alcohol-amino acid ester copolymer of the present invention (transesterification method) includes the step of transesterification of a raw material PVA using a dianionic zinc ate complex represented by the following formula (5).

The use of the dianionic zinc ate complex enables favorable production of a vinyl alcohol-amino acid ester copolymer including a predetermined vinyl alcohol unit and a predetermined amino acid ester unit. Moreover, the use of the dianionic zinc ate complex enables progress of the transesterification in a very short reaction time. Specifically, the reaction can proceed in a time roughly one-tenth of the time needed for transesterification using $CH_3ONa$.

[Chem. 5]

$$t\text{-}Bu_nR_{4-n}ZnM_m \quad (5)$$

In the formula (5), n represents an integer of 1 to 4, m represents 1 or 2, R's may be the same as or different from one another when n represents 1 or 2 and each represent a C1-C8 alkyl, alkenyl, aryl, or arylalkyl group, and M represents lithium or magnesium.

Specific examples of the C1-C8 alkyl, alkenyl, aryl, or arylalkyl group include methyl, ethyl, n-propyl, i-propyl n-butyl, i-butyl, sec-butyl, t-butyl, n-pentyl, n-hexyl, vinyl, phenyl, and benzyl groups.

M represents lithium or magnesium. When M represents lithium, m represents 2. When M represents magnesium, m represents 1.

The dianionic zinc ate complex represented by the above formula (5) is disclosed in JP 2004-292328 A and can be prepared by the method described in JP 2004-292328 A.

Specifically, examples of dilithium salts include dilithium tetra-t-butylzincate, dilithium tri-t-butyl methylzincate, dilithium tri-t-butyl ethylzincate, dilithium tri-t-butyl-n-propylzincate, dilithium tri-t-butyl-n-butylzincate, dilithium tri-t-butyl-i-butylzincate, dilithium tri-t-butyl-sec-butylzincate, dilithium di-t-butyl dimethylzincate, dilithium di-t-butyl diethylzincate, dilithium di-t-butyl di-n-propylzincate, dilithium di-t-butyl di-n-butylzincate, dilithium di-t-butyl di-i-butylzincate, dilithium di-t-butyl di-sec-butylzincate, dilithium t-butyl trimethylzincate, dilithium t-butyl triethylzincate, dilithium t-butyl tri-n-propylzincate, dilithium t-butyl tri-n-butylzincate, dilithium t-butyl tri-i-butylzincate, and dilithium t-butyl tri-sec-butylzincate.

Examples of magnesium salts include magnesium tetra-t-butylzincate, magnesium tri-t-butyl methylzincate, magnesium tri-t-butyl ethylzincate, magnesium tri-t-butyl-n-propylzincate, magnesium tri-t-butyl-n-butylzincate, magnesium tri-t-butyl-i-butylzincate, magnesium tri-t-butyl-sec-butylzincate, magnesium di-t-butyl dimethylzincate, magnesium di-t-butyl diethylzincate, magnesium di-t-butyl di-n-propylzincate, magnesium di-t-butyl di-n-butylzincate, magnesium di-t-butyl di-i-butylzincate, magnesium di-t-butyl di-sec-butylzincate, magnesium t-butyl trimethylzincate, magnesium t-butyl triethylzincate, magnesium t-butyl tri-n-propyizincate, magnesium t-butyl tri-n-butylzincate, magnesium t-butyl tri-i-butylzincate, and magnesium t-butyl tri-sec-butylzincate.

In particular, the dianionic zinc ate complex represented by the above formula (5) is preferably a dilithium salt, and preferably has a C1-C4 alkyl group. Particularly preferred is dilithium tetra-t-butylzincate (TBZL).

The dianionic zinc ate complexes may be used alone or in combination of two or more thereof.

The TBZL can be prepared by the method described in Example 1 in JP 2004-292328 A.

The reaction temperature for the transesterification is not limited, and may be set as appropriate within a range of −80° C. to 200° C. The reaction temperature is preferably in a range of 0° C. to 80° C.

The transesterification may be performed at a normal pressure or a reduced pressure.

The reaction time of the transesterification may be adjusted such that the transesterification is completed. The reaction time is preferably 0.1 to 100 hours, more preferably 1 to 70 hours, still more preferably 5 to 50 hours.

Moreover, at the time of the transesterification, by-product alcohol can be removed by azeotropy with an organic solvent.

In the transesterification, the lower limit of the amount of a dianionic zinc ate catalyst is preferably 0.001 mol and the upper limit thereof is preferably 0.5 mol, per 1 mol of the vinyl alcohol unit in the raw material PVA. The lower limit is more preferably 0.001 mol and the upper limit is more preferably 0.1 mol. The lower limit is still more preferably 0.005 mol and the upper limit is still more preferably 0.05 mol.

In the transesterification using the dianionic zinc ate complex, a preferred method includes, for example, dissolving the raw material PVA in a solvent, adding the dianionic zinc ate complex and an amino acid ester compound to the solution to carry out transesterification, and further adding an acid to terminate the transesterification.

The solvent is not limited, and examples thereof include toluene, dimethyl sulfoxide, acetone, diethyl ether, tetrahydrofuran, water, and solvent mixtures containing these.

Examples of the amino acid ester compound include glycine alkyl ester, aspartic acid acrylic ester, L-tyrosine methyl, L-methionine methyl, L-methionine ethyl, methyl DL-2-aminobutyrate, L-alanine methyl, N-Boc-glycine methyl, β-alanine methyl, N-carbobenzoxyglycine methyl, L-tert-leucine methyl, methyl 2-piperidinecarboxylate, ethyl 2-piperidinecarboxylate, methyl 4-piperidinecarboxylate (methyl isonipecotate), ethyl 4-piperidinecarboxylate, methyl DL-pyroglutamate, 1-methyl L-glutamate, 1-methyl L-aspartate, methyl 3-aminobenzoate, methyl 2-aminothiophene-3-carboxylate, methyl 2-amino-4,5-difluorobenzoate, methyl 4-aminobenzoate, methyl 1-aminocyclopropanecarboxylate, methyl 1-aminocyclohexanecarboxylate, methyl 1-amino-1-cyclopentanecarboxylate, methyl 5-amino-2,4-difluorobenzoate, methyl 3-aminopyrazole-4-carboxylate, methyl 2-(acetylamino)isonicotinate, and methyl 5-amino-2-furoate.

In the transesterification step, a carrier such as a molecular sieve may be added.

Adding the carrier causes adsorption onto the carrier, shifting the chemical equilibrium. The carrier thus serves as a reaction aid.

The molecular sieve used is preferably zeolite. Examples thereof include molecular sieve 3A and molecular sieve 4A. Preferred molecular sieves include molecular sieve 4A.

The transesterification may be performed in a homogeneous system or a heterogeneous system.

The homogeneous system is a system in which a substance is present at a homogeneous concentration, referring to a state where components are dissolved in a solvent. The heterogeneous system is a heterogeneous reaction system in which a substance is localized along with the progress of the reaction, referring to a state where some components such as resin are not dissolved during the progress of the reaction.

The vinyl alcohol-amino acid ester copolymer of the present invention may be used for applications such as raw materials of viscosity modifiers for aqueous solutions, gas barrier coating agents, suspending agents, emulsifiers, polarizers, water-soluble films, dispersants, cell culture media, biomaterials, agricultural films, and various resins (e.g., antibacterial resins).

The vinyl alcohol-amino acid ester copolymer of the present invention may be in any form. Examples of the form include various forms such as fibers, fabrics (e.g., non-woven fabrics), meshes, films, coating films, sheets, bulks, particles, rods, plates, sponges, solutions, paints, gels, and creams. Preferred among these are the forms of fabrics (e.g., non-woven fabrics), sheets, coating films, and particles. It is also preferred to dissolve or disperse the vinyl alcohol-amino acid ester copolymer in water or a mixture of water and an organic solvent such as alcohol, and spray the solution or dispersion.

The vinyl alcohol-amino acid ester copolymer of the present invention can be advantageously used, for example, in any of the above forms as, for example, a cell medium, a biomaterial, an agricultural film, or an antimicrobial.

Advantageous Effects of Invention

The present invention can provide a vinyl alcohol-amino acid ester copolymer that is excellent in properties such as cell culture properties, biocompatibility, antibacterial properties, and solubility in organic solvents, and is applicable to the medical field, the biomaterial field, and the agricultural field (medical and life science fields).

DESCRIPTION OF EMBODIMENTS

The present invention is further described in detail below with reference to examples. The present invention should not be limited to these examples.

Example 1

One part by weight of a raw material PVA (PVA-1, degree of saponification: 98.5, degree of polymerization: 300) was added to 49 parts by weight of DMSO (concentration: 2% by weight) and dissolved therein. Subsequently, 4.4 parts by weight of L-tyrosine methyl and 6 parts by weight of dilithium tetra-t-butylzincate (TBZL, solvent: tetrahydrofuran, concentration: 13% by weight) were added, and the mixture was stirred at 30° C. for 6 hours to perform transesterification.

Thereafter, reprecipitation in tetrahydrofuran was performed, followed by washing with tetrahydrofuran, whereby a product (vinyl alcohol-amino acid ester copolymer) was obtained.

Example 2

A product (vinyl alcohol-amino acid ester copolymer) was obtained as in Example 1 except that the stirring time in the transesterification was changed from "6 hours" to "24 hours".

Example 3

A product (vinyl alcohol-amino acid ester copolymer) was obtained as in Example 1 except that the amount of L-tyrosine methyl added was changed from "4.4 parts by weight" to "8.9 parts by weight".

Example 4

A product (vinyl alcohol-amino acid ester copolymer) was obtained as in Example 1 except that the amount of L-tyrosine methyl added was changed from "4.4 parts by weight" to "17.7 parts by weight".

Example 5

A product (vinyl alcohol-amino acid ester copolymer) was obtained as in Example 4 except that the stirring time in the transesterification was changed from "6 hours" to "24 hours", and reprecipitation and washing were performed with water.

Example 6

A product (vinyl alcohol-amino acid ester copolymer) was obtained as in Example 5 except that the raw material PVA (PVA-1, degree of saponification 98.5, degree of polymerization 300) was replaced with a raw material PVA (PVA-3, degree of saponification 98.5, degree of polymerization 600).

Example 7

A product (vinyl alcohol-amino acid ester copolymer) was obtained as in Example 5 except that the raw material PVA (PVA-1, degree of saponification 98.5, degree of polymerization 300) was replaced with a raw material PVA (PVA-4, degree of saponification 98.5, degree of polymerization 1,000).

Example 8

One part by weight of a raw material poly(vinyl butyral) (PVB, vinyl alcohol unit content: 34 mol %, acetal unit content: 65 mol %, vinyl acetate unit content: 1 mol %, degree of polymerization: 1,700) was added to 19 parts by weight of DMSO (concentration: 5% by weight) and dissolved therein. Subsequently, 2.5 parts by weight of L-tyrosine methyl and 0.25 parts by weight of dilithium tetra-t-butylzincate (TBZL, concentration: 13% by weight) were added, and the mixture was stirred at 30° C. for 6 hours to perform transesterification.

Thereafter, reprecipitation in water was performed, followed by washing with hot water, whereby a product (vinyl butyral-amino acid ester copolymer) was obtained.

Example 9

A product (vinyl alcohol-amino acid. ester copolymer) was obtained as in Example 1 except that the L-tyrosine methyl was replaced with 4-CEP (ethyl 4-piperidinecarboxylate), the amount of TBZL (concentration: 13% by weight) added was changed from "6 parts by weight" to "10 parts by weight", and the stirring time was changed from "6 hours" to "24 hours".

Example 10

A product (vinyl alcohol-amino acid ester copolymer) was obtained as in Example 9 except that the amount of 4-CEP (ethyl 4-piperidinecarboxylate) added was changed from "4.4 parts by weight" to "17.7 parts by weight".

Example 11

A product (vinyl alcohol-amino acid ester copolymer) was obtained as in Example 10 except that the raw material PVA (PVA-1, degree of saponification: 98.5, degree of polymerization: 300) was replaced with a raw material PVA (PVA-3, degree of saponification: 98.5, degree of polymerization: 600).

Example 12

A product (vinyl alcohol-amino acid ester copolymer) was obtained as in Example 10 except that the raw material PVA (PVA-1, degree of saponification: 98.5, degree of polymerization: 300) was replaced with a raw material PVA (PVA-4, degree of saponification: 98.5, degree of polymerization: 1,000).

Example 13

A product (vinyl alcohol-amino acid ester copolymer) was obtained as in Example 8 except that the L-tyrosine methyl was replaced with 4-CEP (ethyl 4-piperidinecarboxylate).

Reference Example

A product (vinyl alcohol-amino acid ester copolymer) was obtained as in Example 1 except that the L-tyrosine methyl was replaced with 2-CEP (ethyl 2-piperidinecarboxylate), the amount of TBZL (concentration: 13% by weight) added was changed from "6 parts by weight" to "10 parts by weight", and the stirring time was changed from "6 hours" to "24 hours".

Comparative Example 1

A vinyl alcohol-vinyl acetate copolymer (PVA-1) having a degree of saponification of 98.5 and a degree of polymerization of 300 was used.

Comparative Example 2

A vinyl alcohol-vinyl acetate copolymer (PVA-2) having a degree of saponification of 88.0 and a degree of polymerization of 600 was used.

Comparative Example 3

A vinyl alcohol-vinyl amine copolymer (amine-modified PVA-1, vinyl amine unit content: 12 mol %) having a degree of saponification of 99.5 and a degree of polymerization of 1,000 was used.

Comparative Example 4

A vinyl alcohol-vinyl amine copolymer (amine-modified PVA-2, vinyl amine unit content: 6 mol %) having a degree of saponification of 99.5 and a degree of polymerization of 500 was used.

Evaluation

The products obtained above were evaluated by the following methods. Table 1 shows the results.

(1) $^1$H-NMR Measurement

The obtained product was subjected to $^1$H-NMR measurement to measure the component ratio (vinyl alcohol unit, amino acid ester unit, acetal unit, vinyl acetate unit, and vinyl amine unit) of the product. $^1$H-NMR measurement was performed at 60° C. using JEOL JNM-ECX500 and a DMSO-$d_6$ solution (1 wt/vol %).

(2) Evaluation of Cell Culture Properties

The obtained product was dissolved in DMSO and then dried to apply the product to the bottom of a 96-well plate. Dulbecco's modified Eagle's medium (DMEM) supplemented with 5% fetal bovine serum (FBS) was used as medium. A cell line for mouse fibroblasts (NIH/3T3 cells) was seeded at 1 ×10$^4$ cells per well and incubated in a 5% $CO_2$/37° C. incubator. Thereafter, the initial adhesion on day 1 of culture, and the proliferation over time and the adhesion maintenance on day 4 of culture were evaluated according to the following criteria.

The number of living cells after culture was determined using a disposable hemocytometer (produced by WakenBtech Co., Ltd). The ratio of the number of living cells after culture to the number of seeded cells was calculated. The cell culture properties were evaluated in accordance with the following criteria based on the obtained ratio of the number of living cells.

Initial Adhesion (Day 1)
- ○○○ (Excellent): The ratio of the number of living cells after culture to the number of seeded cells was 1.5 or higher.
- ○○ (Very good): The ratio of the number of living cells after culture to the number of seeded cells was 1.0 or higher and lower than 1.5.
- ○ (Good): The ratio of the number of living cells after culture to the number of seeded cells was 0.5 or higher and lower than 1.0.
- Δ (Fair): The ratio of the number of living cells after culture to the number of seeded cells was 0.2 or higher and lower than 0.5.
- × (Poor): The ratio of the number of living cells after culture to the number of seeded cells was lower than 0.2.

Proliferation Over Time and Adhesion Maintenance (Day 4)
- ○○○ (Excellent): The ratio of the number of living cells after culture to the number of seeded cells was 3.0 or higher.
- ○○ (Very good): The ratio of the number of living cells after culture to the number of seeded cells was 2.5 or higher and lower than 3.0.
- ○ (Good): The ratio of the number of living cells after culture to the number of seeded cells was 2.0 or higher and lower than 2.5.
- Δ (Fair): The ratio of the number of living cells after culture to the number of seeded cells was 1.0 or higher and lower than 2.0.
- × (Poor): The ratio of the number of living cells after culture to the number of seeded cells was lower than 1.0.

(3) Biocompatibility Evaluation

The biocompatibility was evaluated by performing ATP assay one day and six days after culture in the above evaluation of cell culture properties. The medium was removed from the wells after culture and washed with a phosphate buffer. An ATP extraction reagent (Intracellular ATP assay kit ver. 2, produced by TOYO B-Net Co., Ltd.) in an amount of 100 μl was added, pipetted five times, and left to stand for five minutes at room temperature. ATP was then extracted. A 1,010-μL sample was taken from the ATP extraction. solution, and 100 μL of an ATP luminescent reagent (the same kit) was added and stirred. The amount of luminescence of the sample was measured using Mithras LB940 (produced by Berthold).

Cytotoxicity was calculated by the following equation based on the measured amount of luminescence, and evaluated in accordance with the following criteria.

Cytotoxicity=(Amount of luminescence at six days after culture)/(Amount of luminescence at one day after culture)×100

- ○ (Good): A cytotoxicity of lower than 30%
- × (poor): A cytotoxicity of 30% or higher (4) Thrombus Adhesion The obtained product was dissolved in DMSO, and the solution was sprayed to the inner surface of a PET test tube (inner diameter 10 mm×length 100 mm) (control) and dried. Into the PET tube was added 1 mL of human blood. The mouth of the tube was sealed, and the tube was inverted to wet the entire inner surface of the PET tube with blood.

The tube was left to stand upright at room temperature for about 4 hours. After coagulation of the stationary blood was confirmed, the blood was centrifuged in a centrifuge (1500 G×5 minutes), and the degree of adhesion of blood (portion coated with a pink or pale red ultrathin film) on the inner surface of the headspace of the PET tube was observed.

Based on comprehensive assessment of the intensity of redness and the adhesion area, the thrombus adhesion was relatively evaluated as "○ (Good)", "Δ (Fair)", or "× (Poor)", in order from lower to higher adhesion.

(5) Solubility in Organic Solvents

Toluene (70° C.) was added to the products obtained in Examples 1 to 7 and 9 to 12 and Comparative Examples 1 to 4 (PVA-type products), and butanol (room temperature) was added to the products obtained in Examples 8 and 13 (PVB-type products). The concentration of each product was adjusted to 1.0% by mass. Thereafter, the solutions were stirred for 6 hours at 500 rpm. The solubility was evaluated in accordance with the following criteria based on the content of undissolved matter.

○ (Good): The content of undissolved matter was less than 20% by mass.

× (Poor): The content of undissolved matter was 20% by mass or more.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Raw material (parts by weight) | PVA-1 | 1 | 1 | 1 | 1 | 1 | — | — | — | 1 |
| | PVA-2 | — | — | — | — | — | — | — | — | — |
| | PVA-3 | — | — | — | — | — | 1 | — | — | — |
| | PVA-4 | — | — | — | — | — | — | 1 | — | — |
| | PVB | — | — | — | — | — | — | — | 1 | — |
| | Amine-modified PVA-1 | — | — | — | — | — | — | — | — | — |
| | Amine-modified PVA-2 | — | — | — | — | — | — | — | — | — |
| | DMSO | 49 | 49 | 49 | 49 | 49 | 49 | 49 | 19 | 49 |
| | L-tyrosine methyl | 4.4 | 4.4 | 8.9 | 17.7 | 17.7 | 17.7 | 17.7 | 2.5 | — |
| | 4-CEP (ethyl 4-piperidinecarboxylate) | — | — | — | — | — | — | — | — | 4.4 |
| | TB2L (13% by weight/THF) | 6 | 6 | 6 | 6 | 6 | 6 | 6 | 0.25 | 10 |
| Production process | Reaction temperature (° C.) | 30 | 30 | 30 | 30 | 30 | 30 | 30 | 30 | 30 |
| | Reaction time (hours) | 6 | 24 | 6 | 6 | 24 | 24 | 24 | 6 | 24 |
| Unit content (mol %) | Vinyl alcohol unit | 89.3 | 76.5 | 80.5 | 77.5 | 63.5 | 70.5 | 79.5 | 32 | 47.5 |
| | Amino acid ester unit | 9.2 | 22 | 18 | 21 | 35 | 28 | 19 | 2 | 51 |
| | Acetat unit | 0 | 0 | 0 | 0 | 0 | 0 | 0 | 65 | 0 |
| | Vinyl acetate unit | 1.5 | 1.5 | 1.5 | 1.5 | 1.5 | 1.5 | 1.5 | 1 | 1.5 |
| | Vinyl amine unit | 0 | 0 | 0 | 0 | 0 | 0 | 0 | 0 | 0 |
| Evaluation | Cell culture properties — Initial adhesion (day 1) | ○○ | ○○ | ○○ | ○○ | ○ | ○○ | ○○ | ○○○ | ○○○ |
| | Cell culture properties — Proliferation over time and adhesion maintenance (day 4) | ○ | ○ | ○ | ○ | ○ | ○ | ○ | ○○○ | ○○○ |
| | Biocompatability | ○ | ○ | ○ | ○ | ○ | ○ | ○ | ○ | ○ |
| | Thrombus adhesion | Δ | Δ | Δ | Δ | ○ | ○ | Δ | ○ | ○ |
| | Solubility organic solvents — Toluene (70° C.) | ○ | ○ | ○ | ○ | ○ | ○ | ○ | — | ○ |
| | Solubility organic solvents — Butanol | — | — | — | — | — | — | — | — | — |

| | | Example 10 | Example 11 | Example 12 | Example 13 | Comparative Example 1 | Comparative Example 2 | Comparative Example 3 | Comparative Example 4 |
|---|---|---|---|---|---|---|---|---|---|
| Raw material (parts by weight) | PVA-1 | 1 | — | — | — | 1 | — | — | — |
| | PVA-2 | — | — | — | — | — | 1 | — | — |
| | PVA-3 | — | 1 | — | — | — | — | — | — |
| | PVA-4 | — | — | 1 | — | — | — | — | — |
| | PVB | — | — | — | 1 | — | — | — | — |
| | Amine-modified PVA-1 | — | — | — | — | — | — | 1 | — |
| | Amine-modified PVA-2 | — | — | — | — | — | — | — | 1 |
| | DMSO | 49 | 49 | 49 | 19 | — | — | — | — |
| | L-tyrosine methyl | — | — | — | — | — | — | — | — |
| | 4-CEP (ethyl 4-piperidinecarboxylate) | 17.7 | 17.7 | 17.7 | 2.5 | — | — | — | — |
| | TB2L (13% by weight/THF) | 10 | 10 | 10 | 0.25 | — | — | — | — |
| Production process | Reaction temperature (° C.) | 30 | 30 | 30 | 30 | — | — | — | — |
| | Reaction time (hours) | 24 | 24 | 24 | 6 | — | — | — | — |
| Unit content (mol %) | Vinyl alcohol unit | 36.5 | 43.5 | 50.5 | 31 | 98.5 | 86 | 87.5 | 93.5 |
| | Amino acid ester unit | 62 | 55 | 48 | 3 | 0 | 0 | 0 | 0 |
| | Acetat unit | 0 | 0 | 0 | 65 | 0 | 0 | 0 | 0 |
| | Vinyl acetate unit | 1.5 | 1.5 | 1.5 | 1 | 1.5 | 12 | 0.5 | 0.5 |
| | Vinyl amine unit | 0 | 0 | 0 | 0 | 0 | 0 | 12 | 6 |

TABLE 1-continued

| Evaluation | Cell culture properties | Initial adhesion (day 1) | ○○○ | ○○○ | ○○○ | ○○○ | x | Δ | x | x |
|---|---|---|---|---|---|---|---|---|---|---|
| | | Proliferation over time and adhesion maintenance (day 4) | ○○○ | ○○○ | ○○○ | ○○ | x | x | x | x |
| | Biocompatability | | ○ | ○ | ○ | ○ | x | x | x | x |
| | Thrombus adhesion | | ○ | ○ | ○ | ○ | x | x | x | x |
| | Solubility organic solvents | Toluene (70° C.) | ○ | ○ | ○ | — | ○ | ○ | ○ | — |
| | | Butanol | — | — | — | ○ | — | — | — | ○ |

INDUSTRIAL APPLICABILITY

The present invention can provide a vinyl alcohol-amino acid ester copolymer that is excellent in properties such as cell culture properties, biocompatibility, antibacterial properties, and solubility in organic solvents, and is applicable to the medical field, the biomaterial field, and the agricultural field (medical and life science fields).

The invention claimed is:

1. A vinyl alcohol-amino acid ester copolymer comprising a unit represented by the following formula (1), a unit represented by the following formula (2) and a unit represented by the following formula (3):

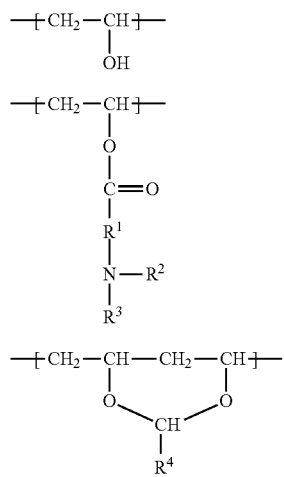

wherein, in the formula (2), $R^1$ is at least one group selected from the group consisting of a C1-C20 linear or branched alkylene group having a phenol substituent and a C1-C20 linear or branched alkylene group having a C2-C20 alkoxycarbonyl substituent, wherein the phenol substituent is hydroxyphenyl, $R^2$ and $R^3$ each independently represent a hydrogen atom or a hydrocarbon group, and $R^1$ and $R^2$, or $R^2$ and $R^3$, may optionally be bonded together to form a cyclic structure; and wherein, in the formula (3), $R^4$ represents a hydrogen atom or a C1-C20 alkyl group.

2. The vinyl alcohol-amino acid ester copolymer according to claim 1,
   wherein the content of the unit represented by the formula (1) is 0.1 to 99.5 mol %.

3. The vinyl alcohol-amino acid ester copolymer according to claim 1,
   wherein the content of the unit represented by the formula (2) is 0.1 to 99.5 mol %.

4. The vinyl alcohol-amino acid ester copolymer according to claim 1,
   wherein the content of the unit represented by the formula (3) is 0.5 to 90 mol %.

5. The vinyl alcohol-amino acid ester copolymer according to claim 1,
   wherein, in the unit represented by the formula (2), $R^2$ and $R^3$ each represent a hydrogen atom or an alkyl group.

6. The vinyl alcohol-amino acid ester copolymer according to claim 1,
   wherein, in the formula (3), $R^4$ represents a C1-C20 alkyl group.

7. The vinyl alcohol-amino acid ester copolymer according to claim 1,
   wherein, in the formula (3), $R^4$ represents an n-propyl group.

* * * * *